INVENTOR
DAVID D. COFFIN
BERNARD L. COOK
BY
ATTY.

March 27, 1951     D. D. COFFIN ET AL     2,546,181
ELECTRICAL CIRCUIT

Filed Feb. 13, 1947     3 Sheets-Sheet 3

INVENTOR
DAVID D. COFFIN
BERNARD L. COOK
BY Elmer J. Gorn
ATTY

Patented Mar. 27, 1951

2,546,181

UNITED STATES PATENT OFFICE 2,546,181

ELECTRICAL CIRCUIT

David D. Coffin, Newton Highlands, and Bernard L. Cook, Medford, Mass., assignors to Raytheon Manufacturing Company, Newton, Mass., a corporation of Delaware Application February 13, 1947, Serial No. 728,282

6 Claims. (Cl. 321—40)

This invention relates to electrical circuits for stabilizing the output of non-linear devices, and more particularly to the output of such devices generally referred to as magnetrons.

The main object of the present invention is to provide electrical circuit means capable of maintaining the radio frequency power output of a magnetron constant irrespective of the load impressed thereacross or of any variation in the line voltage.

The above and other objects will become more evident as the description of the present system progresses, and reference is had to the drawings accompanying same, in which.

Figure 1:
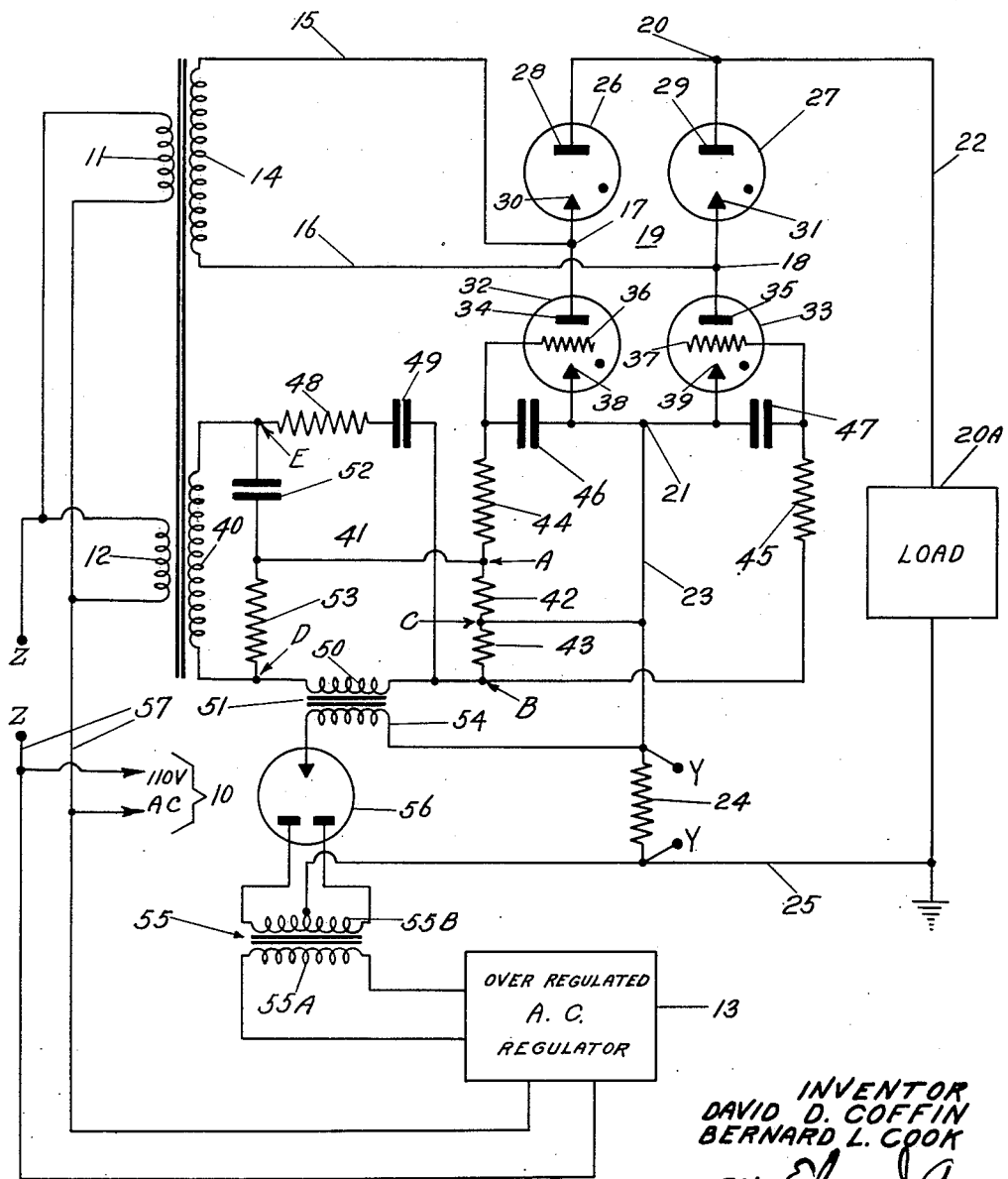
Fig. 1 is a partial block and partial schematic diagram of the control portion of the system of the present invention.

Referring now more particularly to Fig. 1 of the accompanying drawings, the numeral 10 refers to a source of alternating voltage which is applied, respectively, to a pair of primary windings 11 and 12 and an over-regulated alternating voltage regulator 13.

Current flowing in the primary 11 induces a current in a secondary winding 14, cooperating therewith, to produce a very high alternating voltage. This last-named voltage is in turn applied via conductors 15 and 16 to the input junctions 17 and 18 of a bridge type rectifier circuit 19. The rectified output of said bridge circuit is taken from the output junctions 20 and 21 thereof and applied to a load 20A via conductor 22 and conductor 23, resistor 24 and another conductor 25. Said load 20A may be, for example, an electron-discharge device such as a magnetron. When current flows through the load 20A, a potential will be developed across the resistor 24 of a magnitude depending on the amount of current flowing through said resistor. This potential is used to oppose a second source of potential in a manner to be explained presently.

Said bridge type rectifier circuit 19 consists of, for example, a pair of gaseous discharge diodes 26 and 27, each of said diodes including, respectively, anodes 28 and 29 and cathodes 30 and 31 and a pair of grid controlled gaseous discharge devices 32 and 33, known to the art as thyratrons, said devices including, respectively, anodes 34 and 35, control grids 36 and 37, and cathodes 38 and 39.

The anodes 28 and 29 are connected to one of the output junctions 20, and the cathodes 38 and 39 of the thyratrons 32 and 33 are connected to the other output junction 21. The cathodes 30 and 31 of the diodes 26 and 27 are connected, respectively, to the anodes 34 and 35 of the thyratrons and to the respective input junctions 17 and 18.

Referring again to the primary winding 12, said winding induces a current in a secondary winding 40, cooperating therewith, to produce a voltage, which in turn is impressed on the grids 36 and 37 through a phase-shifting network 41.

The voltage from said network will appear across resistors 42 and 43 between points A and B. These last-named resistors are connected from point C to the junction 21 and are so arranged as to provide voltages between points A—C and B—C that are 180 degrees out of phase with respect to each other. This out of phase arrangement for supplying control grid voltages to the thyratrons 32—33 provides means for firing said thyratrons in phase with the alternating potential applied to the anodes 34—35 from the secondary winding 14.

A pair of resistors 44 and 45 serve, respectively, to limit the flow of current to the grids 36 and 37 and a pair of capacitors 46 and 47 serve to by-pass any radio frequency currents to ground.

The phase-shifting network 41 includes in series with the secondary winding 40, a resistor 48, a capacitor 49 and the saturable winding 50 of a saturable reactor 51. With the aforesaid components it is possible to achieve a phase shift somewhat less than 180 degrees. This is due to the fact that a saturable reactor has a variable "Q" and as a result the phase-shift range is therefore limited. However, by including in parallel with the aforementioned components a capacitor 52 and a resistor 53, there is provided, by the present invention, a novel phase-shifting arrangement having a range substantially in excess of 180 degrees. Phase shift is accomplished automatically by altering the inductance of the winding 50 as will be presently explained.

A direct-current potential is supplied to the saturable reactor 51 by the rectified output of a transformer 55, the primary 55A of which is connected to the over-regulated alternating voltage regulator 13. Rectification of the transformer 55 output is accomplished by a full-wave rectifier, such as an electron discharge device, for example, a duo-diode vacuum tube 56 connected across the secondary 55B. The potential thus developed is combined with the potential developed across resistor 24, as previously explained, to develop a difference potential, this potential serving to control the inductive value of the winding 50 of the reactor 51 and in this manner the phase of the network 41.

The over-regulated alternating voltage regulator provides means whereby, for any given increase in the line voltage 10, this regulator will automatically decrease the output voltage therefrom by a value greater than the given increase and vice versa. For example, if the line voltage 10 should increase, say from 110 to 115 volts, the regulator will decrease the output from 115 volts down to 105 volts. The reason for using this type of regulation will be discussed below.

Let it be assumed that it is desired to maintain, substantially constant, a radio frequency output with an input to the magnetron of the order of one ampere when the thyratrons are prevented from firing for about 45°. This phase relation will be further explained in connection with the graps of Figs. 2 and 3.

In the present system, there are present two variables, namely, line voltage and the load current. If either the line voltage varies or the load current changes, it is the purpose of the present invention to automatically compensate the system to maintain a predetermined average input to the load. If, for example, the system of the present invention be used in connection with high-frequency cooking, various foods will require different cooking periods. However, it is essential that, for good cooking operation, the radio frequency energy for the period selected be constant or the food will be either overdone or vice versa.

Because various foods have differing dielectric constants, their effect on the load 20A, when placed in the field generated thereby, will vary the current through said load. Again, assume that the change thus brought about causes a decrease in said current. Consequently this decrease in the current through the load 20A will result in a decrease in the potential drop across the resistor 24.

Now, as pointed out before, the combination of the potential drop across the resistor 24 and the potential developed across the saturating winding 54 of the saturable reactor 51 serves to alter the flux in the core of said reactor and consequently the inductance of winding 50. In the particular embodiment described herein, by way of illustration, the potential developed across the winding 54 is always of a higher order than the potential drop across the resistor 24. Therefore, a decrease in the potential across the resistor 24 will provide an increase in the difference potential across the winding 54 and an accompanying decrease in the inductance of winding 50. As a result, the phase will shift in such a direction as to increase the conduction of the thyratrons 32 and 33 and consequently increase the magnitude of the current through the load 20A. The relation of phase shift to current flow in said thyratrons will be explained in more detail in connection with Figs. 2 and 3.

Figure 2:
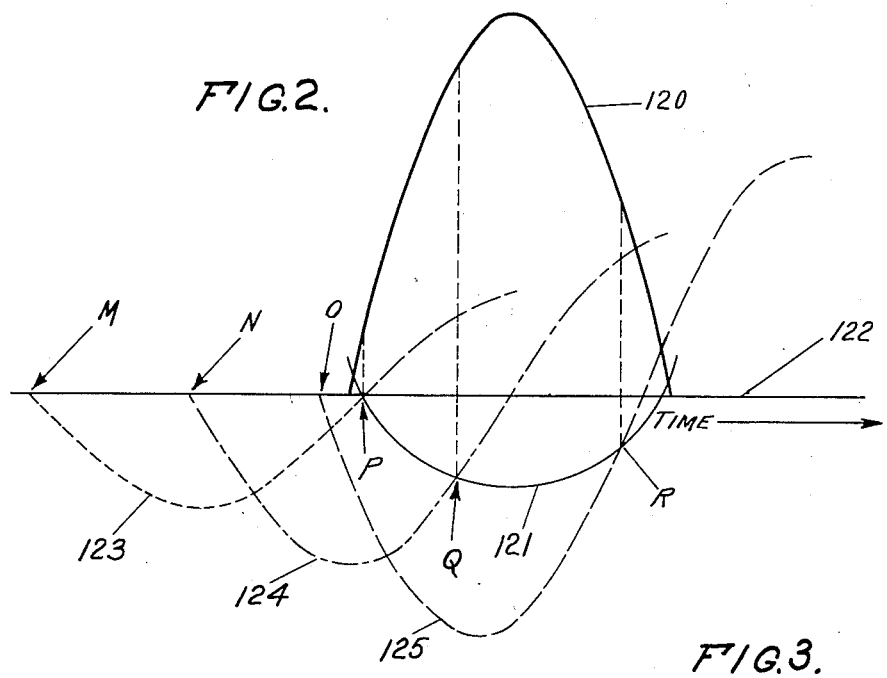
Fig. 2 is a graph illustrating the phase relation of applied grid voltage to the output of the rectifying circuit of the present system.
Figure 3:
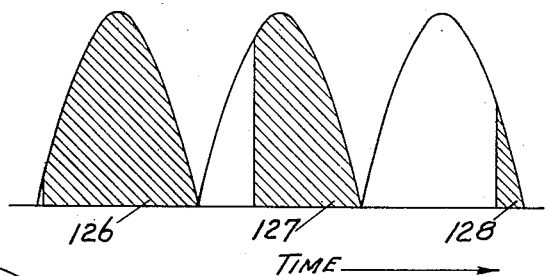
Fig. 3 is a graph illustrating the relative amount of current output in accordance with the phase relations shown in Fig. 2.

Referring now to Figs. 2 and 3 in which the reference numeral 120 represents a half cycle of anode voltage, which may be, for example, the anode voltage of one of the thyratrons 32. The grid control locus 121 represents the magnitude of voltage which, relative to the anode voltage curve 120 above it, is sufficient to prevent firing of the thyratron 32. The base line 122 represents the time axis, and the sine curves 123, 124 and 125 represent instantaneous values of applied grid voltages which appear across either pair of points, for example, A—C of the phase-shifting network 41, since the discussion will be with respect to the operation of the thyratron 32.

A novel feature of the present invention resides in the fact that as the phase is altered from M to N and from N to O, the amplitude of the instantaneous applied grid voltages 123, 124 and 125 increases and by these means crosses the grid control locus 121 at substantial angles thereto as illustrated by the points P, Q, and R. Were it not for this particular phase-shifting network and the arrangement of the components thereof, as described earlier herein, as the phase of the instantaneous grid voltages advanced, without an accompanying increase in amplitude, the grid voltages would not intersect the grid control locus 121 continuously from the beginning of the half cycle of the anode voltage 120 curve to the end thereof. Instead, as said grid voltages were advanced in phase they would not intersect the grid control locus 121 at point R, for example, and the result would be limited control of the thyratron 32.

Fig. 3 indicates more clearly the time during which the current flows in the thyratron 32 for each instantaneous value and phase of grid voltage; the shaded portions 126, 127, and 128 indicating the duration of current flow. As the current through the load 20A decreases, it is desirable to approach the condition indicated by the numeral 126 while, if the current through the load increases, it is desirable to approach the condition, for example, as represented by the shaded area 128. As either of the aforementioned conditions are corrected, the normal condition will be as represented by the shaded area 127.

Figure 4:
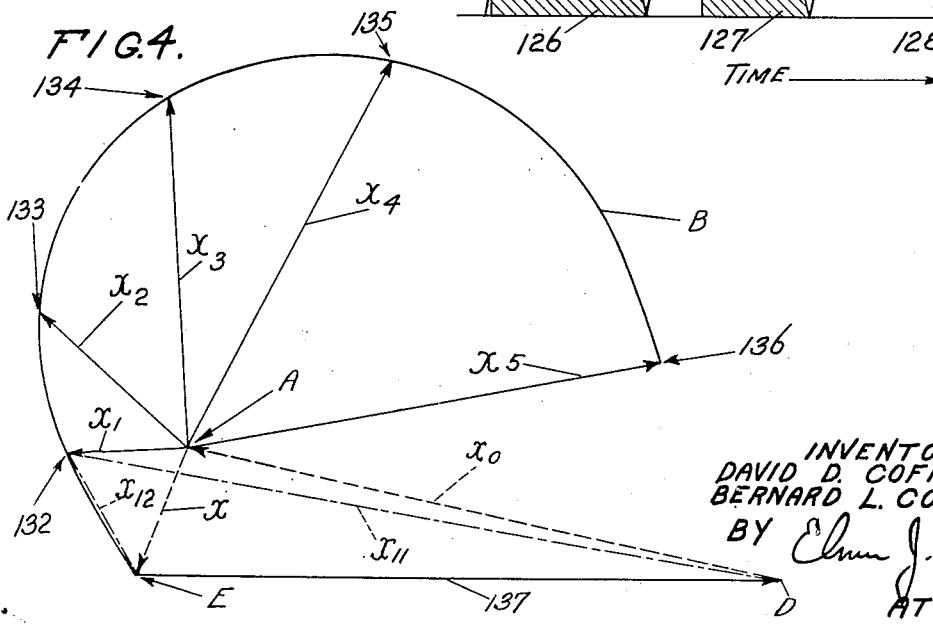
Fig. 4 is a vector diagram illustrating the range of phase shift available in accordance with the present invention and the magnitude of the applied grid voltages shown graphically in Fig. 3.

In Fig. 4, the graph illustrates a locus which indicates the development of a series of grid voltage vectors X, through X₅, as the inductance of the saturated winding 50 is altered in accordance with the earlier description of this system, and it can be readily observed that as said vector rotates through the points 132 to 136, a phase shift range in excess of 180 degrees is quite possible. However, in the particular embodiment, use is made of only about 150 degrees of phase shift. The vectors X through X₅ are developed in the following manner:

Let it be assumed that the voltage across the winding 49 is a predetermined electrical length as indicated by the vector 137. To achieve a phase shift of the order above described, a capacitor 52 and resistor 53 are shunted across the secondary winding 49, and the potential drops across said capacitor and resistor noted. The vector X represents the potential drop across said capacitor 52 while the vector X₀ represents the drop across the resistor 53. By inscribing an arc whose radius from a point D is equal in length to the vector X₀, and then intersecting said last-named arc with another arc, whose radius extends from a point E equal, in length, to the vector X, the position of point A is established.

To determine the course of the locus B, a plurality of points 132—136 are developed as follows:

There is now induced in the winding 54 a current, by any suitable means, which will alter the inductance of the winding 50 due to the change in the amount of saturation of the core of said saturable reactor 51. Potential readings are now taken as represented, for example, by the vector $X_{11}$, the potential drop between points B and D and the drop between points B and E being represented by the vector $X_{12}$. As in the case of the vectors X and $X_o$, the intersecting arcs subtended by the radius of the vectors $X_{11}$ and $X_{12}$ establish, for example, the point 132. The remaining points 133—136 are similarly developed and the locus B is thus established. From the point A the vectors $X_1$—$X_5$ are extended to the respective points 132—136. The respective lengths of said vectors $X_1$—$X_5$ represent the magnitude of the voltage between points A and B as the phase of the network, including the elements 48, 49, 50, 52 and 53, changes.

Figure 5:
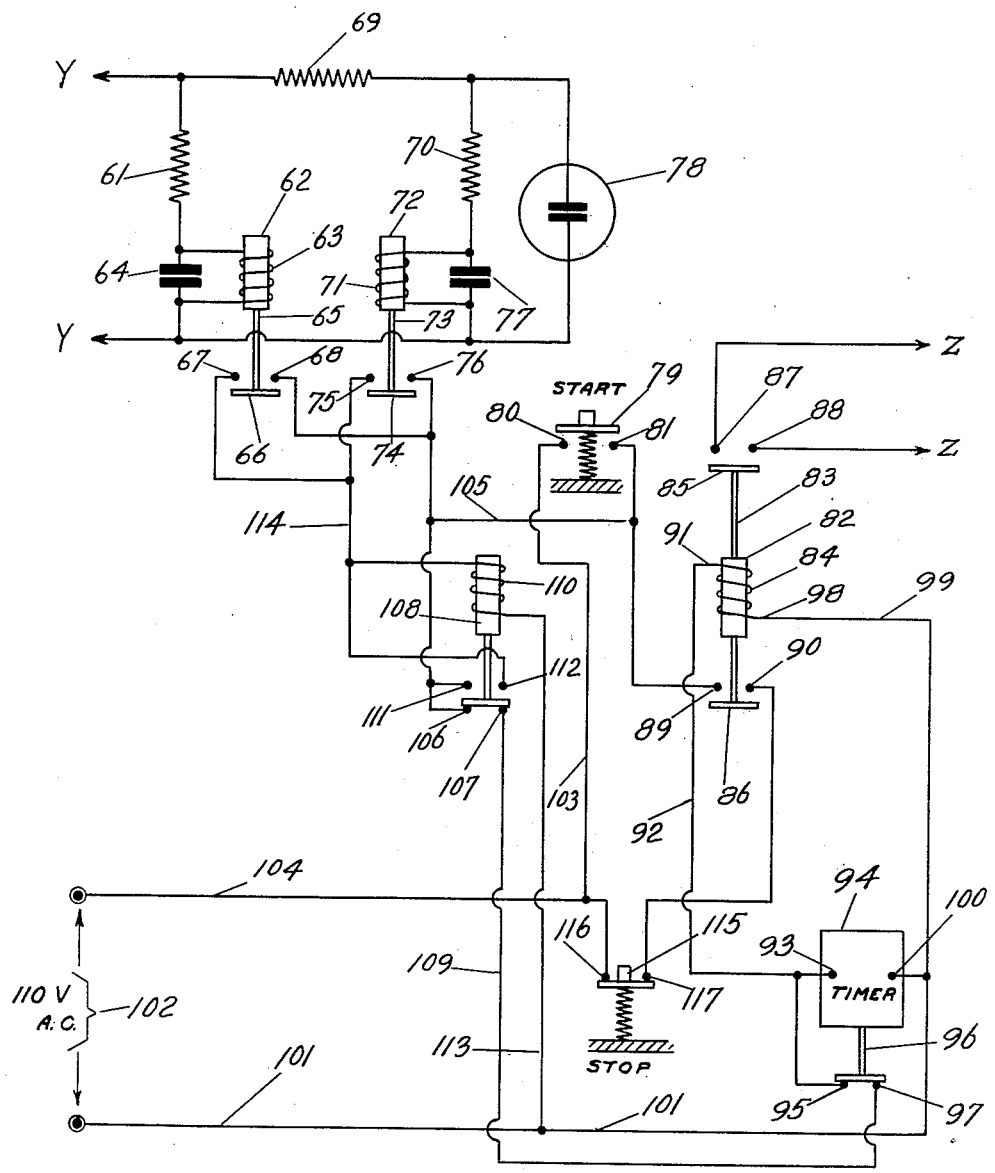
Fig. 5 is a schematic diagram of the protective portion of the present system.

A pair of terminals Z—Z, disposed in one of the conductors 57 of the 110 volt alternating current source 10, and a pair of terminals Y—Y at the ends of the resistor 24, refer to points of connection to the protective circuit of the present invention as illustrated in Fig. 5.

Referring now to Fig. 5, the protective circuit comprises generally means for guarding against excessive current through the load 20A, which will appear across the resistor 24 and therefore between the terminals Y—Y. The excess current would result from a failure of the load 20A to produce a radio frequency output when the system is made operative. As pointed out hereinbefore, the load, in this particular embodiment, a magnetron, is used for the production of radio-frequency oscillations in the microwave region.

The excessive current protective circuit comprises a resistor 61, relay 62, and the winding 63 thereof which is in series with said resistor. Said relay may be, for example, a solenoid type having an armature 65 to which is attached a contact bar 66 for closing the gap between a pair of contacts 67—68. A capacitor 64 is shunt-connected across the winding 63. The value of the resistor 61 is such that, under normal operating conditions of the load 20A, current through said resistor and the winding 63 of the relay 62 will be insufficient to operate said relay. However, should excessive current flow through the resistor 24, a sufficient potential will be developed across points Y—Y to cause the relay 62 to become operative and disconnect the line supply 10 as will be presently explained. The capacitor 64 should have a value sufficient to delay the operation of relay 62, due to the initial current surge, when the system of the present invention is made operative.

The radio-frequency output protective circuit includes a resistor 69 in series with a second resistor 70 and the winding 71 of a relay 72. Said relay may be the same type as relay 62 and will include an armature 73, a contact bar 74, and a pair of contacts 75—76. A capacitor 77, shunt-connected across the winding 71, serves the same purpose as the capacitor 64 above described. Shunted across the resistor 70 and winding 71 is a gaseous discharge device 78, for example, a neon-filled diode. This gaseous discharge device is placed in the radio frequency field generated by the load or magnetron 20A.

Under normal operating conditions the value of the resistor 70 is such that a sufficient potential is developed thereacross to cause a slight ionization of the discharge device 78. As a result, the value of the resistance of the device 78 is such that the total potential developed across resistors 69 and 70 is insufficient to actuate the relay. However, should the current across the resistor 24 drop below a predetermined value, for example, due to a failure of the magnetron 20A to operate properly, but nevertheless above a predetermined minimum value, the potential drop across the resistor 70 will be lowered in accordance therewith. Consequently, the slight ionization of the device 78 previously referred to will diminish or substantially disappear and the resistance of said device increase an amount sufficient to inhibit the passage of current therethrough. As a result substantially all the current will now flow through resistors 69 and 70, the values of which are such that, under the aforementioned conditions, they will develop a potential thereacross sufficient to actuate the relay 72 and interrupt the supply line voltage 10 in a manner which will be described below.

The aforementioned protective circuit, which is connected between points Y—Y, operates in conjunction with a control circuit including the following:

A push button starting switch 79, having a pair of contacts 80 and 81 for controlling the flow of current, in a manner which will be presently described, to a relay 82, is provided. Said relay may also be a solenoid operated type including an armature 83 surrounded by a winding 84. The ends of said armature are connected to a pair of contact bars 85 and 86 for closing the circuits connected to a plurality of contacts 87—88 and 89—90, said contacts being part of said relay 82.

One end 91 of said winding 84 is connected via a conductor 92 to one terminal 93 of a timing device or relay 94, which may also be solenoid operated, and to one of the contacts 95 of said timer, said timer having an armature 96 actuated thereby, said armature serving to close the gap between said contact 95 and a cooperating contact 97. The other end 98 of said relay 82 is connected via a conductor 99 to a second terminal 100 of the timer 94 and via a conductor 101 to one terminal of a source of potential 102, for example, a source of 110 volt alternating current.

In this particular embodiment, the timer contacts 95 and 97 are normally closed subsequent to the manipulation of the switch 79. The contact 80 of said last-named switch is connected via conductors 103 and 104 to the other terminal of said potential source 102.

Closing the starting switch 79 causes current from the source 102 to flow via the conductor 104 and the conductor 103 through the contacts 80—81, through a third conductor 105, thence through a pair of contacts 106—107 of a fifth solenoid operated relay 108, said contacts, under normal operating conditions, being closed as will be presently explained, and continuing from said contact 107 via a conductor 109, through the closed contacts 95 and 97 and thence through the winding 84 via the conductor 99 to the terminal 100 and through the conductor 101 back to the other terminal of the potential source 102.

As a result of the passage of current through the circuit as above described, the relay 82 and timer 94 both become energized. The energization of the relay 82 causes the armature 83 to close the contacts 87—88 and 89—90. The closing of contacts 87—88 completes the circuit between the terminals Z—Z of Fig. 1 and thus energizes same, while the closing of contacts 89—90 closes the timer 94 circuit and sets the mechanism of said timer into operation. The closing of contacts 89—90 now replaces the starter switch 79 contacts, which are allowed to open immediately after they are manipulated to initiate the aforegoing cycle. For a predetermined period the timer will maintain the contacts 95 and 97 closed, and as long as these remain closed and the relay 108 remains deenergized, the relay 82 will remain energized and maintain a flow of current to the circuit in Fig. 1. Upon completion of the timing cycle, the timer solenoid (not shown) becomes energized and opens the contacts 95 and 97 by drawing in the armature 96. This last-named action breaks the winding 84 circuit, and the contacts 87—88 and 89—90 are caused to open, thereby to interrupt the flow of current in the circuit of Fig. 1.

Energization of the relay 108, whose winding 110 controls the actuation of an armature connected therewith, serves to interrupt the flow of current to the relay 82 by opening the contacts 106—107 and closing a pair of cooperating contacts 111—112, in a manner which will be presently described.

In the event, first, of an excessive current condition during operation of the main circuit of Fig. 1, brought about for any reason whatsoever, such excess will of course manifest itself by an increase in potential across the resistor 61 and thereby energize the relay 62 through its winding 63, causing the armature 65 thereof to be drawn in and the contacts 67—68 to close.

The closing of said last-named contacts will cause current to flow from one side of the potential source 102 through conductor 101, conductor 113, winding 110 of relay 108, conductor 114, contacts 67—68, conductor 105, contacts 89—90, which are closed during operation of the Fig. 1 circuit as previously explained, a pair of normally closed contacts 116—117 of stop switch 115 to the other side of the potential source 102. Said last-named stop switch may be used to interrupt the operation of both the protective circuit being described and the circuit of Fig. 1 at any time.

Since all of the actions of the aforementioned relays are substantially instantaneous, as soon as the relay 108 becomes energized, it opens the contacts 106—107 and by so doing interrupts the timer 94 and relay 82 circuit, causing the first to become inoperative and the relay to become deenergized.

In the case where a failure of radio-frequency generation occurs, the relay 72 is energized by the action of the gaseous discharge device 78 as previously described. Since the contacts 75—76 are connected in parallel with the contacts 67—68, the same sequence of events will occur, leading to the interruption of the system.

It will be noted from the foregoing that there has been provided an extremely simple and effective system for maintaining a constant output from a non-linear load such, for example, as the radio frequency output of a magnetron. Said last-named circuit is further simplified by the elimination of rectified voltage filtering capacitors. Another feature of the system of the present invention is the novel protective circuit used in connection therewith to provide the utmost in protection of the equipment used.

Other advantages of the system of the present invention will occur to those skilled in the art to which the same relates, and it should be understood that changes therein may be made without the exercise of invention and within the true spirit and scope of the claims appended hereto.

What is claimed is:

1. An electrical system comprising: a source of alternating voltage; means for rectifying a portion of said voltage; a non-linear device adapted to be energized by said rectified voltage; means, operating on said rectifying means for controlling the magnitude of the current applied to said non-linear device; means, connected in series with said non-linear device and rectifying means for developing a direct potential of predetermined magnitude; and means, responsive to said direct potential, for disconnecting said source of alternating voltage when said direct potential exceeds a predetermined magnitude.

2. An electrical system comprising: a source of alternating voltage; means for rectifying a portion of said voltage; a non-linear device adapted to be energized by said rectified voltage; means, operating on said rectifying means for controlling the magnitude of the current applied to said non-linear device; and means, coupled to said non-linear device, for disconnecting the source of alternating voltage when the output of said non-linear device falls below a predetermined magnitude.

3. An electrical system comprising: a source of alternating voltage; means for rectifying a portion of said voltage; a load device energized by said rectified voltage; first voltage-responsive means operating on said rectifying means for controlling the magnitude of said rectified voltage; second voltage-responsive means connected between said source and said operating means for controlling the voltage supplied to said operating means from said source, said supplied voltage varying in phase and amplitude in response to variations in the voltage applied to said second means; means, connected in series with said load device and rectifying means, for developing a first unidirectional potential proportional to the current flowing through said load; means, connected to said source through an over regulated voltage regulator, for developing a second unidirectional potential which varies as the voltage of said source varies; and means for differentially combining said first and second unidirectional potentials to derive a difference potential and for applying said difference potential to said second voltage-responsive means to control the voltage supplied to said operating means.

4. An electrical system comprising: a source of alternating voltage; means for rectifying a portion of said voltage; a load device energized by said rectified voltage; voltage-responsive means operating on said rectifying means for controlling the magnitude of said rectified voltage; a phase-shifting network, including a voltage-responsive variable impedance, connected between said source and said operating means for controlling the voltage supplied to said operating means from said source, said supplied voltage varying in phase and amplitude in response to variations of said impedance; means, connected in series with said load device and rectifying means, for developing a first unidirectional potential proportional to the current flowing through said load; means, connected to said source through an over regulated voltage regulator, for developing a second unidirectional potential which varies as the voltage of said source varies, and whose magnitude is higher than said first unidirectional potential; and means for differentially combining said first and second unidirectional potentials to derive a difference potential and for applying said difference potential to said variable impedance to vary the same and thereby also the voltage supplied to said operating means.

5. An electrical system comprising: a source of alternating voltage; means for rectifying a portion of said voltage; a load device energized by said rectified voltage; voltage-responsive means operating on said rectifying means for controlling the magnitude of said rectified voltage; a phase-shifting network, including a saturable reactor, connected between said source and said operating means for controlling the voltage supplied to said operating means, said supplied voltage varying in phase and amplitude in response to variations in the control voltage applied to said reactor; means, connected in series with said load device and rectifying means, for developing a first unidirectional potential proportional to the current flowing through said load; means, connected to said source, for developing a second unidirectional potential which varies as the voltage of said source varies; and means for differentially combining said first and second unidirectional potentials to derive a difference potential and for applying said difference potential to said reactor as the control voltage therefor to vary the voltage supplied to said operating means.

6. An electrical system comprising: a source of alternating voltage; means for rectifying a portion of said voltage; said means including a bridge circuit having in at least two of its arms respective grid-controlled gaseous-discharge devices and in at least two of its arms respective high-vacuum discharge devices; a load device energized by said rectified voltage; the grids being voltage-responsive and operating on said rectifying means for controlling the magnitude of said rectified voltage; voltage-responsive means connected between said source and said grids for controlling the voltage supplied to said grids from said source, said supplied voltage varying in phase and amplitude in response to variations in the voltage applied to said voltage-responsive means; means, connected in series with said load device and rectifying means, for developing a first unidirectional potential proportional to the current flowing through said load; means, connected to said source, for developing a second unidirectional potential which varies as the voltage of said source varies; and means for differentially combining said first and second unidirectional potentials to derive a difference potential and for applying said difference potential to said voltage-responsive means to control the voltage supplied to said grids.

DAVID D. COFFIN.
BERNARD L. COOK.

REFERENCES CITED

The following references are of record in the file of this patent:

UNITED STATES PATENTS

| Number | Name | Date |
|---|---|---|
| 2,027,235 | Klemperer | Jan. 7, 1936 |
| 2,101,802 | Winograd | Dec. 7, 1937 |
| 2,103,997 | Bedford | Dec. 28, 1937 |
| 2,299,942 | Trevor | Oct. 27, 1942 |
| 2,325,092 | Andrews | July 27, 1943 |
| 2,380,522 | Haug | July 31, 1945 |